(12) United States Patent
Qu et al.

(10) Patent No.: US 8,585,886 B2
(45) Date of Patent: Nov. 19, 2013

(54) METHOD FOR SYNTHESIS OF TITANIUM DIOXIDE NANOTUBES USING IONIC LIQUIDS

(75) Inventors: Jun Qu, Knoxville, TN (US); Huimin Luo, Knoxville, TN (US); Sheng Dai, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 13/425,540

(22) Filed: Mar. 21, 2012

(65) Prior Publication Data

US 2012/0175266 A1    Jul. 12, 2012

Related U.S. Application Data

(62) Division of application No. 12/481,174, filed on Jun. 9, 2009.

(51) Int. Cl.
*C25D 11/06* (2006.01)

(52) U.S. Cl.
USPC ............ 205/322; 977/892; 977/722; 977/810

(58) Field of Classification Search
None
See application file for complete search history.

(56) References Cited

U.S. PATENT DOCUMENTS

| 6,733,828 | B2 | 5/2004 | Chao et al. |
| 2006/0078726 | A1 | 4/2006 | Antonio et al. |
| 2006/0174932 | A1 | 8/2006 | Usui et al. |

OTHER PUBLICATIONS

Macak et al (2005 Angew. Chem. Int. Ed. 44:7463-7465).*
Grimes C.A., "Synthesis and Application of Highly Ordered Arrays of $TiO_2$ Nanotubes", *Journal of Materials Chemistry* 17:1451-1457 (2007).
Paramasivam I. et al., "Electrochemical Synthesis of Self-Organized $TiO_2$ Nanotubular Structures Using an Ionic Liquid ($BMIM-BF_4$)", *Electrochimica Acta* 54:643-648 (2008).
Gong D. et al., "Titanium Oxide Nanotube Arrays Prepared by Anodic Oxidation", *J. Mater. Res.* 16(12):3331-3334 (2001).
Kuang D. et al., "Application of Highly Ordered TiO Nanotube Arrays in Flexible Dye-Sensitized Solar Cells", *ACS Nano* 2(6):1113-1116 (2008).

* cited by examiner

*Primary Examiner* — Christopher M Gross
(74) *Attorney, Agent, or Firm* — Scully, Scott, Murphy & Presser, P.C.

(57) ABSTRACT

The invention is directed to a method for producing titanium dioxide nanotubes, the method comprising anodizing titanium metal in contact with an electrolytic medium containing an ionic liquid. The invention is also directed to the resulting titanium dioxide nanotubes, as well as devices incorporating the nanotubes, such as photovoltaic devices, hydrogen generation devices, and hydrogen detection devices.

19 Claims, 4 Drawing Sheets

US 8,585,886 B2

METHOD FOR SYNTHESIS OF TITANIUM DIOXIDE NANOTUBES USING IONIC LIQUIDS

CROSS REFERENCE TO RELATED APPLICATIONS

This application is a divisional application of U.S. Ser. No. 12/481,174 filed on Jun. 9, 2009. The entire contents of the aforementioned U.S. Application are incorporated herein by reference.

This invention was made with government support under Contract Number DE-AC05-00OR22725 between the United States Department of Energy and UT-Battelle, LLC. The U.S. government has certain rights in this invention.

FIELD OF THE INVENTION

The present invention relates generally to methods for anodization of titanium, and more particularly, to anodization methods for the preparation of titanium dioxide nanotubes.

BACKGROUND OF THE INVENTION

The unique properties of titanium dioxide ($TiO_2$) nanotubes have resulted in their use in several emerging advanced applications, such as their use as water photoelectrolysis catalysts (i.e., for hydrogen generation), photovoltaic components in dye-sensitized solar cells, and as hydrogen gas sensors. There is ongoing interest in using $TiO_2$ nanotubes for numerous other purposes, including as electronic components, microfluidic devices, nanofiltration devices, drug delivery devices, photocatalytic devices, and tissue engineering components.

$TiO_2$ nanotubes have been prepared by several methods, including electrochemical oxidation (i.e., anodization), hydrothermal synthesis, and template-assisted synthesis. The anodization method typically produces the most highly ordered nanotube structure and most promising photovoltaic properties, as described in, for example, C. A. Grimes, *J. Mater. Chem.*, 17, 1451-1457 (2007). The anodization process is also favored due to its general simplicity and high controllability. The anodization process generally involves anodizing titanium in an electrolytic solution containing water or a polar organic solvent (e.g., ethylene glycol, formamide, N-methylformamide, or dimethylsulfoxide) having dissolved therein a fluoride-containing electrolyte, such as HF, KF, NaF, $NH_4F$, or a tetraalkylammonium fluoride (e.g., $Bu_4NF$).

However, several difficulties remain in anodization processes of the art. For example, the anodization processes of the art are limited in their ability to produce $TiO_2$ nanotubes having improved photovoltaic (PV) properties, particularly those in which an improved PV property results from a finer outer tube diameter (e.g., of or less than 45 nm) and/or higher aspect ratio, e.g., a length-to-diameter aspect ratio of at least 100. In addition, the electrolyte solutions used in anodization processes of the art are generally limited in their attainable electrical conductivity, thereby imposing a high energy usage during anodization. Furthermore, the polar organic solvents of the art (which are gaining in popularity over aqueous solutions) tend to possess one or more unfavorable properties, such as high volatility, flammability, and/or toxicity.

Accordingly, there is a need for a process that can produce $TiO_2$ nanotubes having improved photovoltaic properties, particularly those having finer outer tube diameters (e.g., of or less than 45 nm) and/or higher aspect ratios, e.g., a length-to-diameter aspect ratio of at least 100. There would be a further advantage if such a process was capable of growing the $TiO_2$ nanotubes at substantially high growth rates (e.g., at least 0.2 μm/hr). There is also a need in the art for a process that can produce $TiO_2$ nanotubes with less energy usage, preferably by virtue of an increased electrical conductivity of the anodization medium. There is an additional need in the art for such a process which also does not require solvents that are volatile, flammable, toxic, or which present an environmental liability.

SUMMARY OF THE INVENTION

In one aspect, the invention is directed to a method for producing titanium dioxide nanotubes wherein titanium metal is anodized while in contact with an electrolytic medium containing an ionic liquid. The method advantageously provides the capability of producing $TiO_2$ nanotubes of finer outer tube diameters (e.g., of or less than 45 nm) and/or higher aspect ratios (e.g., length-to-diameter aspect ratios of at least 100) wherein the resulting nanotubes typically possess one or more improved PV properties. The method is also capable of growing $TiO_2$ nanotubes at substantially high growth rates (e.g., at least 0.2 μm/hr). The method is also capable of producing $TiO_2$ nanotubes with less energy usage by virtue of the higher electrical conductivities of ionic liquids as compared to traditional anodization media. Moreover, in comparison to organic solvent-based media of the art, the ionic liquid-based anodization medium of the invention has the advantage of being generally non-volatile, non-flammable, non-toxic, environmentally non-hazardous.

In another aspect, the invention is directed to the $TiO_2$ nanotubes produced by the above process. The $TiO_2$ nanotubes produced by the above process have been generally found to possess superior or unique photovoltaic properties. The superior or unique photovoltaic properties may be attributed to the unique physical and/or compositional characteristics of the produced $TiO_2$ nanotubes. The unique physical characteristics can include, for example, the finer outer tube diameters and higher aspect ratios described above. The unique compositional characteristics can include the predominance of one phase over another (e.g., rutile, anatase, and brookite phases), as well as the presence or absence of a dopant.

In yet other aspects, the invention is directed to a device containing the titanium dioxide nanotubes described above. For example, in one particular embodiment, the device is a photovoltaic device while in another particular embodiment the device is a hydrogen generation device.

DETAILED DESCRIPTION OF THE INVENTION

Figure 1A:
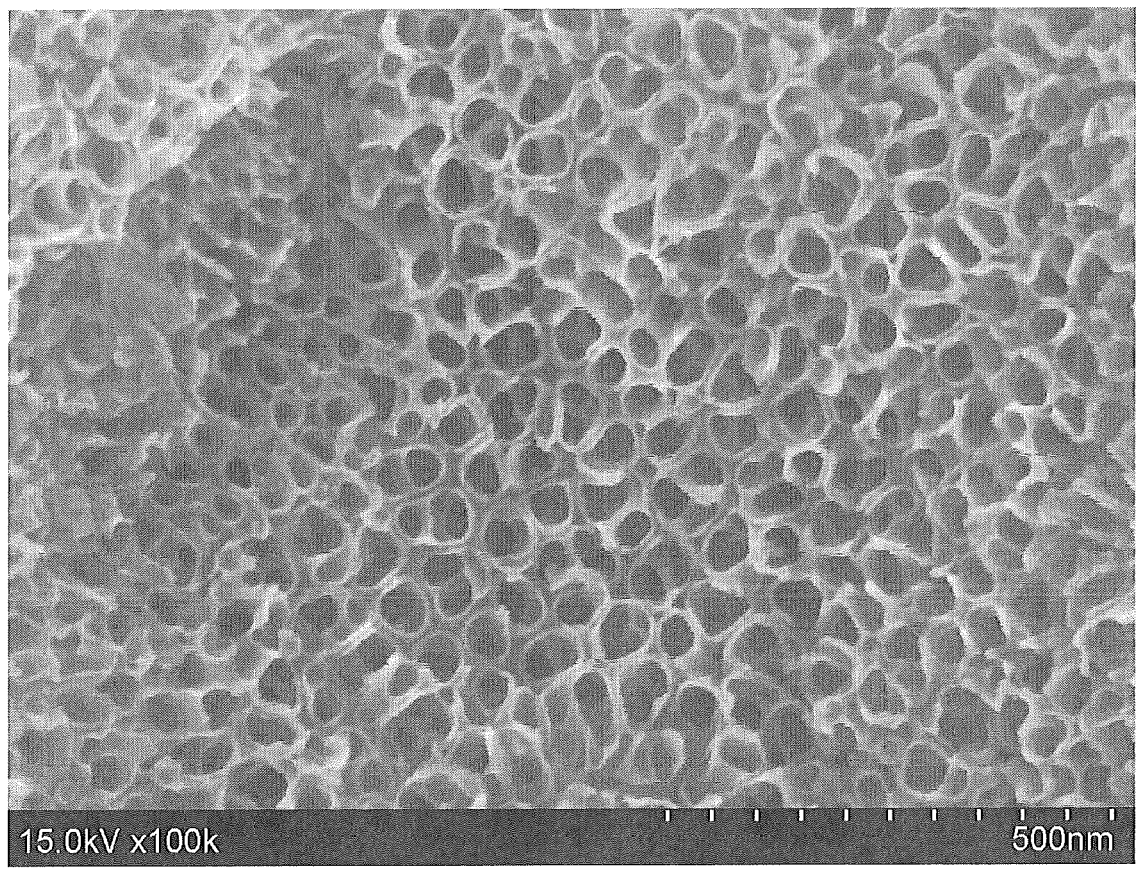
FIGS. 1A, 1B. Top view SEM micrographs at 100,000× magnification (FIG. 1A) and 200,000× magnification (FIG. 1B) of highly ordered $TiO_2$ nanotubes synthesized in the ionic liquid 1-butyl-3-methylimidazolium tetrafluoroborate ($BMIM-BF_4$).

In a first aspect, the invention is directed to a method for producing titanium dioxide nanotubes (also referred to herein as "nanotubes"). As used herein, the term "titanium dioxide" is used interchangeably with "titanium oxide". Either of these terms are meant herein to correspond generally to compositions within the chemical formula $TiO_{2-x}$, wherein $0 \leq x \leq 1$. In different embodiments, the variable x can be, for example, 0, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, or a particular range between any two of the foregoing values. The foregoing generic formula includes the specific composition $TiO_2$, i.e., when x is 0. However, as used herein, the term "$TiO_2$" or "titanium dioxide" or "titanium oxide" is meant to include any one or all of the compositions within the generic formula $TiO_{2-x}$, unless otherwise specified.

The titanium metal used can have any suitable shape and can be either pure titanium metal, a titanium alloy, or a titanium coating on a substrate. Pure titanium can be of any suitable purity level, but in preferred embodiments, the pure titanium has a composition of at least 99.0, 99.9, 99.99, or 99.999% titanium. Some examples of titanium alloys include the numerous intermetallic and non-intermetallic titanium-aluminum alloys (e.g., Ti-6Al-4V, TiAl (e.g., γ-TiAl), $TiAl_3$, or $Ti_3Al$). Some substrates onto which titanium metal may be coated onto include other metals (e.g., aluminum-, tin-, copper-, zinc-, iron-, or cobalt-based metals or metal alloys), metal oxides (e.g., oxides of silicon, aluminum, tin, niobium, and rare earth metals, such as hafnium oxide), organic polymers (e.g., conductive organic polymers), and hybrid organic-inorganic polymers. In a particular embodiment, the titanium metal is a coating on a conducting oxide or doped tin oxide substrate, such as a silicon-doped tin oxide, fluorine-doped tin oxide (FTO), or indium-doped tin oxide (ITO) substrate. To produce a coating of the titanium on a substrate, titanium metal is typically sputtered onto a substrate. Typically, the titanium metal is in the form of a sheet or foil having a suitable thickness, and preferably, a thickness of or less than 1 mm, 0.5 mm, 0.1 mm, 0.05 mm, 0.01 mm, or 0.001 mm, or a range between any two of these values. Alternatively, the foregoing thicknesses describe the thickness of a titanium coating on a substrate, such as a metal- or polymer-based substrate.

The method involves anodizing titanium metal in physical contact with an electrolytic medium (i.e., anodic medium, or anolyte) containing an ionic liquid. As generally known in the art, the anodization process involves application of an anodic voltage to the titanium metal while the titanium metal is in contact with the electrolytic medium. By being in "contact" with the electrolytic medium is generally meant that at least a portion of the titanium metal physically contacts the electrolytic medium during anodization. The $TiO_2$ nanotubes produced herein are those grown at the (titanium metal)-(electrolytic medium) interface. The method described herein preferably permits growth of the $TiO_2$ nanotubes at an efficient growth rate, i.e., a growth rate of at least 0.1, 0.15, 0.2, 0.25, 0.3, 0.4, 0.5, 0.6, 0.7, 0.8, 0.9, 1.0, 1.2, 1.5, 1.7, or 2.0 μm/hr.

The anodic voltage (anodic potential) causes the oxidation of surface titanium metal to titanium dioxide in order that $TiO_2$ nanotubes are produced. In different embodiments, the anodic voltage is preferably at least, for example, 1V, 5V, 10V, 15V, 20V, 25V, 30V, 40V, 50V, 60V, 70V, or 80V, or a range between any two of these values. The anodic potential value can be alternately expressed as a current density. In different embodiments, the current density is preferably at least, for example, $1.0 \times 10^{-5}$, $5.0 \times 10^{-5}$, $1.0 \times 10^{-4}$, $5.0 \times 10^{-4}$, $1.0 \times 10^{-3}$, $5.0 \times 10^{-3}$, $1.0 \times 10^{-2}$, or $5.0 \times 10^{-2}$ $A/cm^2$, or a range between any two of these values.

In one embodiment, the anodic voltage and/or current density is substantially constant, e.g., within 1, 0.5, or 0.1V. In another embodiment, the anodic voltage and/or current density is varied. The anodic voltage and/or current density can be varied by either being increased, decreased, or a combination thereof. The anodic voltage and/or current density can be varied in a substantially continuous or gradual manner by a set rate (e.g., 0.1, 0.5, 1, or 5 V/min); or alternatively, in an abrupt or discontinuous manner (e.g., a sudden change of 10V to 20V); or alternatively, by a change in a gradual rate (e.g., from 0.2 V/min to 1.5 V/min); or alternatively, by a combination of a gradual change and an abrupt change (e.g., 0.5 V/min increase to a voltage of 5V followed by a sudden change to 15V). Any of the embodiments exemplified above in which the voltage varies may also include one or more periods wherein the voltage remains substantially constant.

The anodic voltage or current density can be applied for a suitable period of time. Generally, a period of time is selected to obtain a $TiO_2$ of a particular length, wherein it is understood in the art that longer periods of anodization time result in longer $TiO_2$ nanotube lengths. The higher the growth rate, the less time is required to obtain a $TiO_2$ nanotube of a particular length. Therefore, depending on the $TiO_2$ nanotube lengths desired, in different embodiments, the anodic voltage or current density may be applied for a time period of at least or less than, for example, 1 minute, 2 minutes, 3 minutes, 15 minutes, 30 minutes, 1 hour, 2 hours, 3 hours, 5 hours, 10 hours, or 20 hours, or a range between any two of these values.

The anodization process can be conducted at any suitable temperature. Typically, the process is conducted at about room temperature, i.e., at about 15, 20, 25, or 30° C., or a range between any two of these temperatures. In other embodiments, the process is conducted at an elevated temperature, e.g., at about 40, 50, 60, 70, 80, 90, 100, 110, 120, 130, 140, or 150° C., or a range between any two of these temperatures. In other embodiments, the process is conducted at a reduced temperature, e.g., at about −60, −50, −40, −30, −20, −10, −5, 0, 5, or 10° C., or a range between any two of these temperatures. In yet other embodiments, any of the foregoing exemplary temperatures represent a minimum temperature; or any of the foregoing exemplary temperatures represent a maximum temperature; or the process is conducted within a range of temperatures wherein a minimum and maximum temperature of the range are selected from any of the exemplary temperatures given above (for example, −60 to 40° C., −10 to 50° C., or 50 to 120° C.). Furthermore, in one embodiment, the temperature is substantially constant (e.g., within ±10, 5 or 1° C.), whereas in another embodiment, the temperature is varied. The temperature can be varied by either being increased, decreased, or a combination thereof. The temperature can be varied in a substantially continuous or gradual manner by a set rate (e.g., 1, 5, 10, or 15° C./min); or alternatively, in an abrupt or discontinuous manner (e.g., a change of at least 20° C. within 1 minute); or alternatively, by a change in a gradual rate (e.g., from 2° C./min to 10° C./min); or alternatively, by a combination of a gradual change and an abrupt change (e.g., a change from 4° C./min to 25° C./min). Any of the embodiments exemplified above in which the temperature varies may also include one or more periods wherein the temperature remains substantially constant.

The anodization process can be followed by an annealing process (i.e., a post-annealing step). An annealing process can be useful to, for example, modify the phase of the initially produced $TiO_2$ nanotubes, e.g., to convert initially amorphous-phase $TiO_2$ nanotubes to crystalline-phase $TiO_2$ nanotubes. More crystalline $TiO_2$ nanotubes typically possess an improved charge transport property, and therefore, are generally more suitable for dye-sensitized solar cell (DSSC) applications. The annealing process is generally conducted at a temperature of at least 300° C., 350° C., 400° C., 450° C., 475° C., 500° C., 525° C., 550° C., 575° C., 600° C., 625° C., 650° C., 675° C., or 700° C., or a range governed by any two of these values. Typically, the annealing process is conducted under an oxygen-containing environment. However, other environments may be used to modify the composition. For example, an inert atmosphere environment (e.g., nitrogen or argon) may be used to limit the amount of oxidation. Alternatively, for example, a carbonaceous environment (e.g., $CO_2$, CO, $CH_4$, or $CH_2CH_2$) can be used to create carbon-modified $TiO_2$ nanotubes.

According to the inventive method, the electrolytic medium contains one or more ionic liquids. As understood in the art, an ionic liquid includes a cationic component and an anionic (counteranionic or counterion) component. In some embodiments, the counteranion is preferably structurally symmetrical. In other embodiments, the counteranion is preferably structurally asymmetrical.

The counteranion ($X^-$) of the ionic liquid is any counteranion which, when associated with the cationic component, permits the resulting ionic compound to behave as an ionic liquid. As known in the art, the composition and structure of the counteranion strongly affects the properties (e.g., melting point, volatility, stability, viscosity, hydrophobicity, and so on) of the ionic liquid.

In one embodiment, the counteranion of the ionic liquid is non-carbon-containing (i.e., inorganic). The inorganic counteranion may, in one embodiment, lack fluorine atoms. Some examples of such counteranions include chloride, bromide, iodide, hexachlorophosphate ($PCl_6^-$), perchlorate, chlorate, chlorite, perbromate, bromate, bromite, periodate, iodate, dicyanamide (i.e., $N(CN)_2^-$) aluminum chlorides (e.g., $Al_2Cl_7^-$ and $AlCl_4^-$), aluminum bromides (e.g., $AlBr_4^-$), nitrate, nitrite, sulfate, sulfite, phosphate, phosphite, arsenate, antimonate, selenate, tellurate, tungstate, molybdate, chromate, silicate, the borates (e.g., borate, diborate, triborate, tetraborate), anionic borane and carborane clusters (e.g., $B_{10}H_{10}^{2-}$ and $B_{12}H_{12}^{2-}$), perrhenate, permanganate, ruthenate, perruthenate, and the polyoxometallates. The inorganic counteranion may, in another embodiment, include fluorine atoms. Some examples of such counteranions include fluoride, hexachlorophosphate ($PF_6^-$), tetrafluoroborate, aluminum fluorides (e.g., $AlF_4^-$), hexafluoroarsenate ($AsF_6^-$), and hexafluoroantimonate ($SbF_6^-$).

In another embodiment, the counteranion of the ionic liquid is carbon-containing (i.e., organic). The organic counteranion may, in one embodiment, lack fluorine atoms. Some examples of such counteranions include carbonate, the carboxylates (e.g., formate, acetate, propionate, butyrate, valerate, lactate, pyruvate, oxalate, malonate, glutarate, adipate, decanoate, and the like), the sulfonates (e.g., $CH_3SO_3^-$, $CH_3CH_2SO_3^-$, $CH_3(CH_2)_2SO_3^-$, benzenesulfonate, toluenesulfonate, dodecylbenzenesulfonate, and the like), the alkoxides (e.g., methoxide, ethoxide, isopropoxide, and phenoxide), the amides (e.g., dimethylamide and diisopropylamide), diketonates (e.g., acetylacetonate), the organoborates (e.g., $BR_1R_2R_3R_4^-$, wherein $R_1$, $R_2$, $R_3$, $R_4$ are typically hydrocarbon groups containing 1 to 6 carbon atoms), the alkylsulfates (e.g., diethylsulfate), alkylphosphates (e.g., ethylphosphate or diethylphosphate), and the phosphinates (e.g., bis-(2,4,4-trimethylpentyl)phosphinate). The organic counteranion may, in another embodiment, include fluorine atoms. Some examples of such counteranions include the fluorosulfonates (e.g., $CF_3SO_3^-$, $CF_3CF_2SO_3^-$, $CF_3(CF_2)_2SO_3^-$, $CHF_2CF_2SO_3^-$, and the like), the fluoroalkoxides (e.g., $CF_3O^-$, $CF_3CH_2O^-$, $CF_3CF_2O^-$, and pentafluorophenolate), the fluorocarboxylates (e.g., trifluoroacetate and pentafluoropropionate), and the fluorosulfonylimides (e.g., $(CF_3SO_2)_2N^-$).

In a particular embodiment, the counteranion ($X^-$) of the ionic liquid has a formula within the general chemical formula

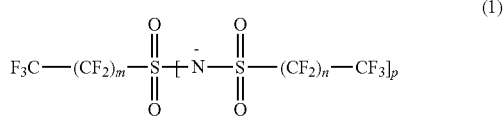

(1)

In formula (1) above, subscripts m and n are independently 0 or an integer of 1 or above. Subscript p is 0 or 1, provided that when p is 0, the group $-N-SO_2-(CF_2)_nCF_3$ subtended by p is replaced with an oxide atom connected to the sulfur atom (S).

In one embodiment, subscript p is 1, so that formula (1) reduces to the chemical formula:

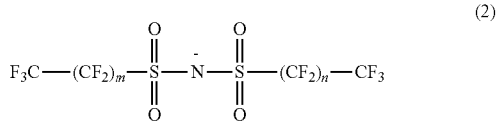

(2)

In one embodiment of formula (2), m and n are the same number, thereby resulting in a symmetrical counteranion. In another embodiment of formula (2), m and n are not the same number, thereby resulting in an asymmetrical counteranion.

In a first set of embodiments of formula (2), m and n are independently at least 0 and up to 1, 2, 3, 4, 5, 6, 7, 8, 9, 10, or 11. For example, in a particular embodiment, m is 0 while n is a value of 0 or above (e.g., 0, 1, 2, 3, 4, 5, 6, 7, 8, 9, 10, or 11). Some examples of such anions include $F_3CSO_2NSO_2CF_3$ ($Tf_2N^-$), $F_3CSO_2NSO_2CF_2CF_3$, $F_3CSO_2NSO_2(CF_2)_2CF_3$, $F_3CSO_2NSO_2(CF_2)_3CF_3$, $F_3CSO_2NSO_2(CF_2)_4CF_3$, $F_3CSO_2NSO_2(CF_2)_5CF_3$, and so on, wherein it is understood that, in the foregoing examples, the negative sign indicative of a negative charge (i.e., "−") in the anion has been omitted for the sake of clarity.

In a second set of embodiments of formula (2), m and n are independently at least 1 and up to 2, 3, 4, 5, 6, 7, 8, 9, 10, or 11. For example, in a particular embodiment, m is 1 while n is a value of 1 or above (e.g., 1, 2, 3, 4, 5, 6, 7, 8, 9, 10, or 11). Some examples of such anions include $N[SO_2CF_2CF_3]_2$ (i.e., "BETI"), $F_3CF_2CSO_2NSO_2(CF_2)_2CF_3$, $F_3CF_2CSO_2NSO_2(CF_2)_3CF_3$, $F_3CF_2CSO_2NSO_2(CF_2)_4CF_3$, $F_3CF_2CSO_2NSO_2(CF_2)_5CF_3$, and so on.

In a third set of embodiments of formula (2), m and n are independently at least 2 and up to 3, 4, 5, 6, 7, 8, 9, 10, or 11. For example, in a particular embodiment, m is 2 while n is a value of 2 or above (e.g., 2, 3, 4, 5, 6, 7, 8, 9, 10, or 11). Some examples of such anions include $N[SO_2(CF_2)_2CF_3]_2$, $F_3C(F_2C)_2SO_2NSO_2(CF_2)_3CF_3$, $F_3C(F_2C)_2SO_2NSO_2(CF_2)_4CF_3$, $F_3C(F_2C)_2SO_2NSO_2(CF_2)_5CF_3$, and so on.

In a fourth set of embodiments of formula (2), m and n are independently at least 3 and up to 4, 5, 6, 7, 8, 9, 10, or 11. For example, in a particular embodiment, m is 3 while n is a value of 3 or above (e.g., 3, 4, 5, 6, 7, 8, 9, 10, or 11). Some examples of such anions include $N[SO_2(CF_2)_3CF_3]_2$, $F_3C(F_2C)_3$ $SO_2NSO_2(CF_2)_4CF_3$, $F_3C(F_2C)_3SO_2NSO_2(CF_2)_5CF_3$, $F_3C(F_2C)_3SO_2NSO_2(CF_2)_6CF_3$, $F_3C(F_2C)_3SO_2NSO_2(CF_2)_7CF_3$, and so on.

In a fifth set of embodiments of formula (2), m and n are independently at least 4 and up to 5, 6, 7, 8, 9, 10, or 11. For example, in a particular embodiment, m is 4 while n is a value of 4 or above (e.g., 4, 5, 6, 7, 8, 9, 10, or 11). Some examples of such anions include $N[SO_2(CF_2)_4CF_3]_2$, $F_3C(F_2C)_4SO_2NSO_2(CF_2)_5CF_3$, $F_3C(F_2C)_4SO_2NSO_2(CF_2)_6CF_3$, $F_3C(F_2C)_4SO_2NSO_2(CF_2)_7CF_3$, $F_3C(F_2C)_4SO_2NSO_2(CF_2)_8CF_3$, and so on.

In a sixth set of embodiments of formula (2), m and n are independently at least 5 and up to 6, 7, 8, 9, 10, or 11. For example, in a particular embodiment, m is 5 while n is a value of 5 or above (e.g., 5, 6, 7, 8, 9, 10, or 11). Some examples of such anions include $N[SO_2(CF_2)_5CF_3]_2$, $F_3C(F_2C)_5SO_2NSO_2(CF_2)_6CF_3$, $F_3C(F_2C)_5SO_2NSO_2(CF_2)_7CF_3$, $F_3C(F_2C)_5SO_2NSO_2(CF_2)_8CF_3$, $F_3C(F_2C)_5SO_2NSO_2(CF_2)_9CF_3$, and so on.

In a seventh set of embodiments of formula (2), m and n are independently at least 6 and up to 7, 8, 9, 10, or 11. For example, in a particular embodiment, m is 6 while n is a value of 6 or above (e.g., 6, 7, 8, 9, 10, or 11). Some examples of such anions include $N[SO_2(CF_2)_6CF_3]_2$, $F_3C(F_2C)_6SO_2NSO_2(CF_2)_7CF_3$, $F_3C(F_2C)_6SO_2NSO_2(CF_2)_8CF_3$, $F_3C(F_2C)_6SO_2NSO_2(CF_2)_9CF_3$, $F_3C(F_2C)_6SO_2NSO_2(CF_2)_{10}CF_3$, and so on.

In other embodiments of formula (2), m abides by one or a number of alternative conditions set forth in one of the foregoing seven embodiments while n abides by one or a number of alternative conditions set forth in another of the foregoing seven embodiments.

In another embodiment, subscript p is 0, so that formula (1) reduces to the chemical formula:

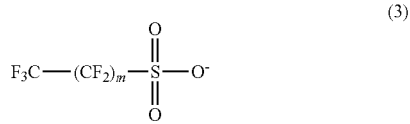

(3)

In different exemplary embodiments of formula (3), m can be 0 or above (e.g., up to 1, 2, 3, 4, 5, 6, 7, 8, 9, 10, or 11), 1 or above (e.g., up to 2, 3, 4, 5, 6, 7, 8, 9, 10, or 11), 2 or above (e.g., up to 3, 4, 5, 6, 7, 8, 9, 10, or 11), 3 or above (e.g., up to 4, 5, 6, 7, 8, 9, 10, or 11), 4 or above (e.g., up to 5, 6, 7, 8, 9, 10, or 11), 5 or above (e.g., up to 6, 7, 8, 9, 10, or 11), 6 or above (e.g., up to 7, 8, 9, 10, or 11), 7 or above (e.g., up to 8, 9, 10, 11, or 12), 8 or above (e.g., up to 9, 10, 11, or 12), or 9 or above (e.g., up to 10, 11, 12, 13, 14, 15, or 16). Some examples of such anions include $F_3CSO_3^-$ (i.e., "triflate" or "TfO$^-$"), $F_3CF_2CSO_3^-$, $F_3C(F_2C)_2SO_3^-$, $F_3C(F_2C)_3SO_3^-$ (i.e., "nonaflate" or "NfO$^-$"), $F_3C(F_2C)_4SO_3^-$, $F_3C(F_2C)_5SO_3^-$, $F_3C(F_2C)_6SO_3^-$, $F_3C(F_2C)_7SO_3^-$, $F_3C(F_2C)_8SO_3^-$, $F_3C(F_2C)_9SO_3^-$, $F_3C(F_2C)_{10}SO_3^-$, $F_3C(F_2C)_{11}SO_3^-$, and so on.

The ionic liquids of the invention are generally in liquid form (i.e., fluids) at or below 100° C., more preferably at or below 50° C., and even more preferably, at or below room temperature (i.e., at or less than about 15, 20, 25, or 30° C.). In other embodiments, the ionic liquids are in liquid form at or below 0° C., −5° C., −10° C., −20° C., or −30° C. Preferably, the ionic liquid possesses a melting point which is at or below any of the temperatures given above. Though the invention primarily contemplates ionic liquids that are naturally fluids at or below room temperature, the invention also contemplates ionic liquids that are solid or semi-solid at about room temperature or above, but which can be rendered liquids at a higher temperature by the application of heat. The latter embodiment may be particularly suitable if the anodization process is preferably conducted at a higher temperature (i.e., above room temperature).

The density of the ionic liquid is generally above 1.2 g/mL at an operating temperature of interest, and particularly at a temperature within 20-30° C. In different embodiments, the density of the ionic liquid is preferably at least 1.2, 1.3, 1.4, 1.5, 1.6, 1.7, or 1.8 g/mL, or a particular range between any two of these values.

The viscosity of the ionic liquid is preferably no more than 50,000 centipoise (50,000 cP) at an operating temperature of interest, and particularly at a temperature within 20-30° C. In more preferred embodiments, the viscosity of the ionic liquid is no more than about 25,000 cP, 10,000 cP, 5,000 cP, 2,000 cP, 1,000 cP, 800 cP, 700 cP, 600 cP, 500 cP, 400 cP, 300 cP, 200 cP, 100 cP, or 50 cP. Alternatively, the viscosity of the ionic liquid may preferably be within a particular range established between any two of the foregoing exemplary values.

The conductivity of the ionic liquid is preferably at least 0.01 mS/cm (0.001 S/m) at an operating temperature of interest, and particularly at a temperature within 20-30° C. In different embodiments, the conductivity of the ionic liquid may preferably be at least 0.01, 0.05, 0.1, 0.5, 1.0, 2.0, 3.0, 4.0, 5.0, 6.0, 7.0, 8.0, 9.0, 10.0, 11.0. or 12.0 mS/cm, or a particular range between any two of the foregoing values.

In one embodiment, the ionic liquid is an imidazolium-based ionic liquid having a formula within the general formula:

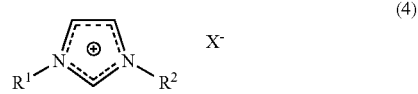

(4)

In formula (4) above, $R^1$ and $R^2$ are each independently a saturated or unsaturated, straight-chained, branched, or cyclic hydrocarbon group having at least one carbon atom, and $X^-$ is a counteranion, as described above. In one embodiment, $R^1$ and $R^2$ are different in structure or number of carbon atoms, whereas in another embodiment, $R^1$ and $R^2$ are the same either in structure or number of carbon atoms. In different embodiments, $R^1$ and $R^2$ each independently have a minimum of at least one, two, three, four, five, six, seven, or eight carbon atoms. In other embodiments, $R^1$ and $R^2$ each independently have a maximum of two, three, four, five, six, seven, eight, nine, ten, eleven, twelve, thirteen, fourteen, fifteen, sixteen, seventeen, or eighteen carbon atoms. In other embodiments, $R^1$ and $R^2$ independently have a number of carbon atoms within a range of carbon atoms established by a combination of any of the exemplary minimum and maximum carbon numbers given above.

In a first embodiment, one or both of $R^1$ and $R^2$ are saturated and straight-chained hydrocarbon groups (i.e., straight-chained alkyl groups). Some examples of straight-chained alkyl groups include methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, and n-octadecyl groups.

In a second embodiment, one or both of $R^1$ and $R^2$ are saturated and branched hydrocarbon groups (i.e., branched alkyl groups). Some examples of branched alkyl groups include isopropyl, isobutyl, sec-butyl, t-butyl, isopentyl, neopentyl, 2-methylpentyl, 3-methylpentyl, and the numerous $C_7$, $C_8$, $C_9$, $C_{10}$, $C_{11}$, $C_{12}$, $C_{13}$, $C_{14}$, $C_{15}$, $C_{16}$, $C_{17}$, and $C_{18}$ saturated and branched hydrocarbon groups.

In a third embodiment, one or both of $R^1$ and $R^2$ are saturated and cyclic hydrocarbon groups (i.e., cycloalkyl groups). Some examples of cycloalkyl groups include cyclopropyl, cyclobutyl, cyclopentyl, cyclohexyl, cycloheptyl, cyclooctyl, and their methyl-, ethyl-, and propyl-substituted derivatives and/or their methylene, dimethylene, trimethylene, and tetramethylene cross-linked derivatives (as crosslinked to a nitrogen atom of the imidazolium ring). The cycloalkyl group can also be a polycyclic (e.g., bicyclic) group by either possessing a bond between two of the ring groups (e.g., dicyclohexyl) or a shared (i.e., fused) side (e.g., decalin and norbornane).

In a fourth embodiment, one or both of $R^1$ and $R^2$ are unsaturated and straight-chained hydrocarbon groups (i.e., straight-chained olefinic or alkenyl groups). Some examples of straight-chained olefinic groups include vinyl, 2-propen-1-yl, 3-buten-1-yl, 2-buten-1-yl, butadienyl, 4-penten-1-yl, 3-penten-1-yl, 2-penten-1-yl, 2,4-pentadien-1-yl, 5-hexen-1-yl, 4-hexen-1-yl, 3-hexen-1-yl, 3,5-hexadien-1-yl, 1,3,5-hexatrien-1-yl, 6-hepten-1-yl, ethynyl, propargyl, and the numerous $C_7$, $C_8$, $C_9$, $C_{10}$, $C_{11}$, $C_{12}$, $C_{13}$, $C_{14}$, $C_{15}$, $C_{16}$, $C_{17}$, and $C_{18}$ unsaturated and straight-chained hydrocarbon groups.

In a fifth embodiment, one or both of $R^1$ and $R^2$ are unsaturated and branched hydrocarbon groups (i.e., branched olefinic or alkenyl groups). Some branched olefinic groups include 2-propen-2-yl, 3-buten-2-yl, 3-buten-3-yl, 4-penten-2-yl, 4-penten-3-yl, 3-penten-2-yl, 3-penten-3-yl, 2,4-pentadien-3-yl, and the numerous $C_6$, $C_7$, $C_8$, $C_9$, $C_{10}$, $C_{11}$, $C_{12}$, $C_{13}$, $C_{14}$, $C_{15}$, $C_{16}$, $C_{17}$, and $C_{18}$ unsaturated and branched hydrocarbon groups.

In a sixth embodiment, one or both of $R^1$ and $R^2$ are unsaturated and cyclic hydrocarbon groups. Some examples of unsaturated and cyclic hydrocarbon groups include cyclopropenyl, cyclobutenyl, cyclopentenyl, cyclopentadienyl, cyclohexenyl, cyclohexadienyl, phenyl, benzyl, cycloheptenyl, cycloheptadienyl, cyclooctenyl, cyclooctadienyl, cyclooctatetraenyl, and their methyl-, ethyl-, and propyl-substituted derivatives and/or their methylene, dimethylene, trimethylene, and tetramethylene cross-linked derivatives (as crosslinked to a nitrogen atom of the imidazolium ring). The unsaturated cyclic hydrocarbon group can also be a polycyclic (e.g., bicyclic) group by either possessing a bond between two of the ring groups (e.g., biphenyl) or a shared (i.e., fused) side (e.g., naphthalene, anthracene, and phenanthrene).

In one embodiment, as in the examples above, one or more of the hydrocarbon groups are composed solely of carbon and hydrogen, i.e., do not include one or more heteroatoms, such as oxygen or nitrogen atoms. In another embodiment, one or more of the hydrocarbon groups include one or more heteroatoms, such as one or more oxygen, nitrogen, and/or fluorine atoms. Some examples of oxygen-containing hydrocarbon groups include those possessing one or more hydroxyl (OH) groups, carbonyl groups (e.g., ketone, ester, amide, or urea functionalities), and/or carbon-oxygen-carbon (ether) groups. In a particular embodiment, the oxygen-containing hydrocarbon group includes two or more ether groups, such as a polyalkyleneoxide group, such as a polyethyleneoxide group. Some examples of nitrogen-containing hydrocarbon groups include those possessing one or more primary amine groups, secondary amine groups, tertiary amine groups, and/or quaternary amine groups, wherein it is understood that a quaternary amine group necessarily possesses a positive charge and requires a counteranion. Some examples of fluorine-containing hydrocarbon groups (i.e., fluorocarbon groups) include the partially-substituted varieties (e.g., fluoromethyl, difluoromethyl, 2-fluoroethyl, 2,2-difluoroethyl, 2,2,2-trifluoroethyl, and the like) and perfluoro-substituted varieties (e.g., perfluoromethyl, perfluoroethyl, perfluoropropyl, perfluorobutyl, and the like).

The ionic liquids according to formula (4) can contain any of the above-described imidazolium-based cationic components associated (i.e., complexed) with any of the above-described counteranions X. Some examples of imidazolium-based ionic liquids according to formula (4) include [1,3-dimethylimidazolium]$^+$[X]$^-$, [1-methyl-3-ethylimidazolium]$^+$[X]$^-$, [1-methyl-3-n-propylimidazolium]$^+$[X]$^-$, [1-methyl-3-isopropylimidazolium]$^+$[X]$^-$, [1-methyl-3-n-butylimidazolium]$^+$[X]$^-$ (i.e., BMIM$^+$X$^-$), [1-methyl-3-isobutylimidazolium]$^+$[X]$^-$, [1-methyl-3-sec-butylimidazolium]$^+$[X]$^-$, [1-methyl-3-t-butylimidazolium]$^+$[X]$^-$, [1,3-diethylimidazolium]$^+$[X]$^-$, [1-ethyl-3-n-propylimidazolium]$^+$[X]$^-$, [1-ethyl-3-isopropylimidazolium]$^+$[X]$^-$, [1-ethyl-3-n-butylimidazolium]$^+$[X]$^-$, [1-ethyl-3-isobutylimidazolium]$^+$[X]$^-$, [1-ethyl-3-sec-butylimidazolium]$^+$[X]$^-$, [1-ethyl-3-t-butylimidazolium]$^+$[X]$^-$, [1,3-di-n-propylimidazolium]$^+$[X]$^-$, [1-n-propyl-3-isopropylimidazolium]$^+$[X]$^-$, [1-n-propyl-3-n-butylimidazolium]$^+$[X]$^-$, [1-n-propyl-3-isobutylimidazolium]$^+$[X]$^-$, [1-n-propyl-3-sec-butylimidazolium]$^+$[X]$^-$, [1-n-propyl-3-t-butylimidazolium]$^+$[X]$^-$, [1,3-diisopropylimidazolium]$^+$[X]$^-$, [1-isopropyl-3-n-butylimidazolium]$^+$[X]$^-$, [1-isopropyl-3-isobutylimidazolium]$^+$[X]$^-$, [1-isopropyl-3-sec-butylimidazolium]$^+$[X]$^-$, [1-isopropyl-3-t-butylimidazolium]$^+$[X]$^-$, [1,3-di-n-butylimidazolium]$^+$[X]$^-$, [1-n-butyl-3-isobutylimidazolium]$^+$[X]$^-$, [1-n-butyl-3-sec-butylimidazolium]$^+$[X]$^-$, [1-n-butyl-3-t-butylimidazolium]$^+$[X]$^-$, [1,3-diisobutylimidazolium]$^+$[X]$^-$, [1-isobutyl-3-sec-butylimidazolium]$^+$[X]$^-$, [1-isobutyl-3-t-butylimidazolium]$^+$[X]$^-$, [1,3-di-sec-butylimidazolium]$^+$[X]$^-$, [1-sec-butyl-3-t-butylimidazolium]$^+$[X]$^-$, [1,3-di-t-butylimidazolium]$^+$[X]$^-$, [1-methyl-3-pentylimidazolium]$^+$[X]$^-$, [1-methyl-3-hexylimidazolium]$^+$[X]$^-$, [1-methyl-3-heptylimidazolium]$^+$[X]$^-$, [1-methyl-3-octylimidazolium]$^+$[X]$^-$, [1-methyl-3-decylimidazolium]$^+$[X]$^-$, [1-methyl-3-dodecylimidazolium]$^+$[X]$^-$, [1-methyl-3-tetradecylimidazolium]$^+$[X]$^-$, [1-methyl-3-hexadecylimidazolium]$^+$[X]$^-$, [1-methyl-3-octadecylimidazolium]$^+$[X]$^-$, [1-(2-hydroxyethyl)-3-methylimidazolium]$^+$[X]$^-$, [1-allyl-3-methylimidazolium]$^+$[X]$^-$, wherein [X]$^-$ can be any of the counteranions as described above. In a preferred embodiment, the counteranion [X]$^-$ is selected from one or more of $PF_6^-$, $BF_4^-$, $(CF_3SO_2)_2N^-$, $CF_3SO_3^-$, an organoborate (e.g., $BR_1R_2R_3R_4)^-$, $CH_3CO_2^-$, $CF_3CO_2^-$, $NO_3^-$, $Br^-$, $Cl^-$, $I^-$, $Al_2Cl_7^-$, and $AlCl_4^-$. Particularly preferred counteranions are those having a formula within the formulas (1), (2), or (3).

In formula (4), any one or more of the hydrogen atoms of the ring carbon atoms can be substituted with a hydrocarbon group. In a particular embodiment, the 2-position of the imidazole ring is substituted with a methyl group. Some examples of such ionic liquids include [1-butyl-2,3-dimethylimidazolium]$^+$[X]$^-$ and [1-octyl-2,3-dimethylimidazolium]$^+$[X]$^-$.

In another embodiment, the ionic liquid is an N-alkylpyridinium-based ionic liquid having a formula within the general formula:

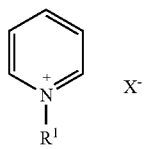
(5)

In formula (5), $R^1$ represents a hydrocarbon group (with or without heteroatom substitution), such as any of the hydrocarbon groups described above for $R^1$ and $R^2$ of formula (4), and the counteranion $X^-$ can be any of the counteranions described above. Some examples of N-alkylpyridinium-based ionic liquids include N-methylpyridinium $X^-$, N-ethylpyridinium $X^-$, N-n-propylpyridinium $X^-$, N-isopropylpyridinium $X^-$, N-n-butylpyridinium $X^-$, N-isobutylpyridinium $X^-$, N-sec-butylpyridinium $X^-$, N-t-butylpyridinium $X^-$, N-n-pentylpyridinium $X^-$, N-isopentylpyridinium $X^-$, N-neopentylpyridinium $X^-$, N-n-hexylpyridinium $X^-$, N-n-heptylpyridinium $X^-$, N-n-octylpyridinium $X^-$, N-n-nonylpyridinium $X^-$, N-n-decylpyridinium $X^-$, N-n-undecylpyridinium $X^-$, N-n-dodecylpyridinium $X^-$, N-n-tridecylpyridinium $X^-$, N-n-tetradecylpyridinium $X^-$, N-n-pentadecylpyridinium $X^-$, N-n-hexadecylpyridinium $X^-$, N-n-heptadecylpyridinium $X^-$, N-n-octadecylpyridinium $X^-$, N-vinylpyridinium $X^-$, N-allylpyridinium $X^-$, N-phenylpyridinium $X^-$, N-(2-hydroxyethyl)pyridinium $X^-$, N-benzylpyridinium $X^-$, and N-phenethylpyridinium $X^-$, wherein $X^-$ can be any of the counteranions described above, including the preferred counteranions.

In formula (5), any one or more of the hydrogen atoms of the ring carbon atoms can be substituted with a hydrocarbon group. Some examples of such ionic liquids include N-methyl-4-methylpyridinium $X^-$, N-ethyl-4-methylpyridinium $X^-$, N-methyl-4-ethylpyridinium $X^-$, and N-octyl-4-methylpyridinium $X^-$.

In another embodiment, the ionic liquid is an ammonium-based ionic liquid having a formula within the general formula:

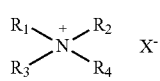
(6)

In formula (6), $R^1$, $R^2$, $R^3$, and $R^4$ independently represent a hydrocarbon group (with or without heteroatom substitution), such as those described above for $R^1$ and $R^2$ of formula (4), or a hydrogen atom, wherein at least one of $R^1$, $R^2$, $R^3$, and $R^4$ represents a hydrocarbon group (with or without heteroatom substitution), and the counteranion $X^-$ can be any of the counteranions described above, including the preferred counteranions. In one embodiment, one of $R^1$, $R^2$, $R^3$, and $R^4$ is a hydrocarbon group while the rest are hydrogen atoms. In another embodiment, two of $R^1$, $R^2$, $R^3$, and $R^4$ are hydrocarbon groups while two are hydrogen atoms. In another embodiment, three of $R^1$, $R^2$, $R^3$, and $R^4$ are hydrocarbon groups while one is a hydrogen atom. In another embodiment, all of $R^1$, $R^2$, $R^3$, and $R^4$ are hydrocarbon groups. Some examples of ammonium-based ionic liquids include methylammonium$^+X^-$, dimethylammonium$^+X^-$, trimethylammonium$^+X^-$, tetramethylammonium$^+X^-$, ethylammonium$^+X^-$, ethyltrimethylammonium$^+X^-$, diethylammonium$^+X^-$, triethylammonium$^+X^-$, tetraethylammonium$^+X^-$, n-propylammonium$^+X^-$, n-propyltrimethylammonium$^+X^-$, isopropylammonium$^+X^-$, n-butylammonium$^+X^-$, n-butyltrimethylammonium$^+X^-$, n-butylmethylammonium$^+X^-$, di-(n-butyl)dimethylammonium$^+X^-$, tri-(n-butyl)methylammonium$^+X^-$, n-pentylammonium$^+X^-$, n-pentyltrimethylammonium$^+X^-$, tri-(n-pentyl)methylammonium$^+X^-$, n-hexylammonium$^+X^-$, n-hexyltrimethylammonium$^+X^-$, tri-(n-hexyl)methylammonium$^+X^-$, n-heptylammonium$^+X^-$, n-heptyltrimethylammonium$^+X^-$, tri-(n-heptyl)methylammonium$^+X^-$, n-octylammonium$^+X^-$, n-octyltrimethylammonium$^+X^-$, tri-(n-octyl)methylammonium$^+X^-$, choline$^+X^-$, 2-hydroxyethylammonium$^+X^-$, allylammonium$^+X^-$, allyltrimethylammonium$^+X^-$, [(2-methacryloxy)ethyl]trimethylammonium$^+X^-$, and (4-vinylbenzyl)trimethylammonium$^+X^-$, wherein $X^-$ can be any of the counteranions as described above. In a preferred embodiment, the counteranion $X^-$ is selected from one or more of $PF_6^-$, $BF_4^-$, $(CF_3SO_2)_2N^-$, $CF_3SO_3^-$, an organoborate (e.g., $BR_1R_2R_3R_4)^-$, $CH_3CO_2^-$, $HCO_2^-$, $CF_3CO_2^-$, $NO_3^-$, $H_2PO_4^-$, $Br^-$, $Cl^-$, $I^-$, $Al_2Cl_7^-$, and $AlCl_4^-$. Particularly preferred counteranions are those having a formula within the formulas (1), (2), or (3).

In another embodiment, the ionic liquid is a phosphonium-based ionic liquid having a formula within the general formula:

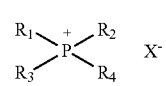
(7)

In formula (7), $R^1$, $R^2$, $R^3$, and $R^4$ independently represent a hydrocarbon group (with or without heteroatom substitution), such as those described above for $R^1$ and $R^2$ of formula (4), and the counteranion $X^-$ can be any of the counteranions described above, including the preferred counteranions. Some examples of phosphonium-based ionic liquids include butyltrimethylphosphonium$^+X^-$, dibutyldimethylphosphonium$^+X^-$, tributylmethylphosphonium$^+X^-$, butyltriethylphosphonium$^+X^-$, dibutyldiethylphosphonium$^+X^-$, tributylethylphosphonium$^+X^-$, tetrabutylphosphonium$^+X^-$, triisobutylmethylphosphonium$^+X^-$, tributylhexylphosphonium$^+X^-$, tributylheptylphosphonium$^+X^-$, tributyloctylphosphonium$^+X^-$, tributyldecylphosphonium$^+X^-$, tributyldodecylphosphonium$^+X^-$, tributyltetradecylphosphonium$^+X^-$, tributylhexadecylphosphonium$^+X^-$, hexyltrimethylphosphonium$^+X^-$, dihexyldimethylphosphonium$^+X^-$, trihexylmethylphosphonium$^+X^-$, hexyltriethylphosphonium$^+X^-$, tetrahexylphosphonium$^+X^-$, trihexyloctylphosphonium$^+X^-$, trihexyldecylphosphonium$^+X^-$, trihexyldodecylphosphonium$^+X^-$, trihexyltetradecylphosphonium$^+X^-$, trihexylhexadecylphosphonium$^+X^-$, octyltrimethylphosphonium$^+X^-$, dioctyldimethylphosphonium$^+X^-$, trioctylmethylphosphonium$^+X^-$, octyltriethylphosphonium$^+X^-$, tetraoctylphosphonium$^+X^-$, trioctyldecylphosphonium$^+X^-$, trioctyldodecylphosphonium$^+X^-$, trioctyltetradecylphosphonium$^+X^-$, trioctylhexadecylphosphonium$^+X^-$, tridecylmethylphosphonium$^+X^-$, tetradecylphosphonium$^+X^-$, wherein $X^-$ can be any of the counteranions described above, including the preferred counteranions.

In another embodiment, the ionic liquid is a piperidinium-based ionic liquid having a formula within the general formula:

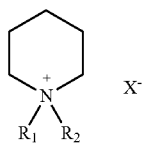

(8)

In formula (8), $R^1$ and $R^2$ independently represent a hydrocarbon group (with or without heteroatom substitution), such as those described above for $R^1$ and $R^2$ of formula (4), and the counteranion $X^-$ can be any of the counteranions described above, including the preferred counteranions. Some examples of piperidinium-based ionic liquids include 1,1-dimethylpiperidinium$^+X^-$, 1-methyl-1-ethylpiperidinium$^+$ $X^-$, 1-methyl-1-propylpiperidinium$^+X^-$, 1-methyl-1-butylpiperidinium$^+X^-$, 1-methyl-1-isobutylpiperidinium$^+X^-$, 1-methyl-1-pentylpiperidinium$^+X^-$, 1-methyl-1-hexylpiperidinium$^+X^-$, 1-methyl-1-heptylpiperidinium$^+X^-$, 1-methyl-1-octylpiperidinium$^+X^-$, 1-methyl-1-decylpiperidinium$^+X^-$, 1-methyl-1-dodecylpiperidinium$^+X^-$, 1-methyl-1-tetradecylpiperidinium$^+X^-$, 1-methyl-1-hexadecylpiperidinium$^+X^-$, 1-methyl-1-octadecylpiperidinium$^+X^-$, 1,1-diethylpiperidinium$^+X^-$, 1,1-dipropylpiperidinium$^+X^-$, 1,1-dibutylpiperidinium$^+X^-$, and 1,1-diisobutylpiperidinium$^+X^-$, wherein $X^-$ can be any of the counteranions described above, including the preferred counteranions.

In another embodiment, the ionic liquid is a pyrrolidinium-based ionic liquid having a formula within the general formula:

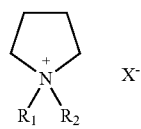

(9)

In formula (9), $R^1$ and $R^2$ independently represent a hydrocarbon group (with or without heteroatom substitution), such as those described above for $R^1$ and $R^2$ of formula (4), and the counteranion $X^-$ can be any of the counteranions described above, including the preferred counteranions. Some examples of pyrrolidinium-based ionic liquids include 1,1-dimethylpyrrolidinium$^+X^-$, 1-methyl-1-ethylpyrrolidinium$^+$ $X^-$, 1-methyl-1-propylpyrrolidinium$^+X^-$, 1-methyl-1-butylpyrrolidinium$^+X^-$, 1-methyl-1-isobutylpyrrolidinium$^+X^-$, 1-methyl-1-pentylpyrrolidinium$^+X^-$, 1-methyl-1-hexylpyrrolidinium$^+X^-$, 1-methyl-1-heptylpyrrolidinium$^+X^-$, 1-methyl-1-octylpyrrolidinium$^+X^-$, 1-methyl-1-decylpyrrolidinium$^+X^-$, 1-methyl-1-dodecylpyrrolidinium$^+X^-$, 1-methyl-1-tetradecylpyrrolidinium$^+X^-$, 1-methyl-1-hexadecylpyrrolidinium$^+X^-$, 1-methyl-1-octadecylpyrrolidinium$^+X^-$, 1,1-diethylpyrrolidinium$^+X^-$, 1,1-dipropylpyrrolidinium$^+X^-$, 1,1-dibutylpyrrolidinium$^+X^-$, and 1,1-diisobutylpyrrolidinium$^+X^-$, wherein $X^-$ can be any of the counteranions described above, including the preferred counteranions.

In another embodiment, the ionic liquid is a sulfonium-based ionic liquid having a formula within the general formula:

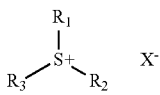

(10)

In formula (10), $R^1$, $R^2$, and $R^3$ independently represent a hydrocarbon group (with or without heteroatom substitution), such as those described above for $R^1$ and $R^2$ of formula (4), and the counteranion $X^-$ can be any of the counteranions described above, including the preferred counteranions. Some examples of sulfonium-based ionic liquids include trimethylsulfonium$^+X^-$, dimethylethylsulfonium$^+X^-$, diethylmethylsulfonium$^+X^-$, triethylsulfonium$^+X^-$, dimethylpropylsulfonium$^+X^-$, dipropylmethylsulfonium$^+X^-$, tripropylsulfonium$^+X^-$, dimethylbutylsulfonium$^+X^-$, dibutylmethylsulfonium$^+X^-$, tributylsulfonium$^+X^-$, dimethylhexylsulfonium$^+X^-$, dihexylmethylsulfonium$^+X^-$, trihexylsulfonium$^+X^-$, dimethyloctylsulfonium$^+X^-$, dioctylmethylsulfonium$^+X^-$, and trioctylsulfonium$^+X^-$, wherein $X^-$ can be any of the counteranions described above, including the preferred counteranions.

The ionic liquid can also be composed of several other types of cationic components, such as the many nitrogen- or sulfur-containing ring systems not mentioned above. Some of these other ring systems include, for example, cationic derivatives of piperazine, pyrazine, pyrrole, thiophene, thiazine, phenothiazine, morpholine, 1,4-thioxane, and 1,4-dithiane ring systems, all of which are contemplated herein as cationic components of an ionic liquid.

The ionic liquid can be of any suitable purity level. Preferably, the ionic liquid has a purity at least or greater than 95%, 96%, 97%, 98%, 99%, 99.5%, or 99.9%. The ionic liquid is preferably substantially devoid of salt byproducts (e.g., $LiNO_3$) that are typically produced during synthesis of the ionic liquid. In preferred embodiments, it is desirable that the ionic liquid contains less than 1% by weight of salt byproducts, and more preferably, less than 0.5%, 0.1%, 0.01%, or even 0.001% by weight of salt byproducts.

In one embodiment, the electrolytic medium contains solely one or a combination of ionic liquids. For example, the electrolytic medium can be substantially devoid of any non-ionic liquid compounds or materials, such as any solvents and electrolyte salts.

In another embodiment, the electrolytic medium contains one or more ionic liquids in admixture with one or more non-ionic liquids. The one or more non-ionic liquids may function as, for example, a solvent for the ionic liquid or other admixed compounds, or as a reactive material which is consumed in the preparation of the $TiO_2$ nanotubes, or as a property modifier of the electrolytic medium (e.g., to adjust viscosity or volatility), or as a process modifier.

In one embodiment, the one or more non-ionic liquids include a polar protic liquid. Some examples of polar protic non-ionic liquids include water, the alcohols (e.g., methanol, ethanol, isopropanol, n-butanol, t-butanol, the pentanols, hexanols, octanols, or the like), diols (e.g., ethylene glycol, diethylene glycol, triethylene glycol), and protic amines (e.g., ethylenediamine, ethanolamine, diethanolamine, and triethanolamine).

In another embodiment, the one or more non-ionic liquids include a polar non-protic liquid. Some examples of polar non-protic non-ionic liquids include the nitriles (e.g., acetonitrile, propionitrile), sulfoxides (e.g., dimethylsulfoxide), amides (e.g., dimethylformamide, N,N-dimethylacetamide), organochlorides (e.g., methylene chloride, chloroform, 1,1,- trichloroethane), ketones (e.g., acetone, 2-butanone), dialkylcarbonates (e.g., ethylene carbonate, dimethylcarbonate, diethylcarbonate), organoethers (e.g., diethyl ether, tetrahydrofuran, and dioxane), HMPA, NMP, and DMPU.

In yet another embodiment, the one or more non-ionic liquids include a non-polar liquid. Some examples of non-polar liquids include the liquid hydrocarbons, such as a pentane, hexane, heptane, octane, pentene, hexene, heptene, octene, benzene, toluene, or xylene.

In different embodiments, the non-ionic liquid may be included in an amount of, or at least, or less than, for example, 0.1 wt %, 0.5 wt %, 10 wt %, 20 wt %, 30 wt %, 40 wt %, 50 wt %, 60 wt %, 70 wt %, 80 wt %, 90 wt % by total weight of the ionic liquid and non-ionic liquid. The non-ionic liquid may also be preferably present within a range established by any two of the foregoing values.

In some embodiments, one or more of any of the foregoing classes of non-ionic liquids, or specific non-ionic liquids, is excluded. For example, in some embodiments, it may be preferable to exclude non-ionic liquids having a boiling point over 25° C., 50° C., or 100° C. In other embodiments, it may be preferable to exclude non-ionic liquids having a boiling point under 25° C., 50° C., or 100° C. In yet other embodiments, it may be preferable to include a non-ionic liquid in which the ionic liquid is substantially soluble, or partially soluble, or substantially insoluble (e.g., as separate phases). In a particular embodiment, non-ionic liquids are not present, i.e., excluded.

In one embodiment, the electrolytic medium (i.e., ionic liquid therein) is substantially devoid of water. By being "substantially devoid" of water is meant that the ionic liquid contains less than 0.5%, 0.1%, or 0.01% by weight of water (i.e., wt %) with respect to the total weight of ionic liquid and water. In a particular embodiment, the ionic liquid is completely devoid of water (i.e., dry) such that any water present is less than 0.001 wt %, or undetectable.

In another embodiment, the ionic liquid contains an amount of water. In different embodiments, the amount of water can preferably be at, less than, or at least 1 wt %, 2 wt %, 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, 95 wt %, or 97 wt % of water by total weight of the ionic liquid and water. The water may also be preferably present within a range established by any two of the foregoing values.

In one embodiment, the ionic liquid is admixed with one or more electrolyte salts or acids. The acid can be a strong acid (e.g., the mineral acids) or weak acid (e.g., organoacid, such as a carboxylic or phosphoric acid). Some examples of electrolyte salts or acids include the fluoride-containing electrolytes (e.g., HF, KF, LiF, NaF, $NH_4F$, or a tetraalkylammonium fluoride, such as $Bu_4NF$), chloride-containing electrolytes (e.g., HCl, KCl, NaCl, $NH_4Cl$, or a tetraalkylammonium chloride, such as $Et_4NCl$), bromide-containing salts (e.g., HBr, KBr, NaBr, $NH_4Br$, or a tetraalklyammonium bromide, such as $Bu_4NBr$), nitrate salts (e.g., $LiNO_3$, $NaNO_3$, $KNO_3$, and $Mg(NO_3)_2$), nitrite salts, phosphate salts, phosphite salts, alkylphosphate salts, phosphinate salts, sulfate salts, alkylsulfate salts, carboxylate salts (e.g., sodium glycolate, sodium acetate, sodium propionate, potassium oxalate), carbonate salts, bicarbonate salts, perchlorate salts, chlorate salts, perbromate salts, and bromate salts.

The electrolytic medium may also include one or more surfactants. The surfactants can be included to, for example, modify or adjust the growth characteristics of the $TiO_2$ nanotubes during growth.

In one embodiment, the one or more surfactants includes an ionic surfactant, which can be either an anionic, cationic, or zwitterionic surfactant. Some examples of anionic surfactants include the fluorinated and non-fluorinated carboxylates (e.g., perfluorooctanoates, perfluorodecanoates, perfluorotetradecanoates, octanoates, decanoates, tetradecanoates, fatty acid salts), the fluorinated and non-fluorinated sulfonates (e.g., perfluorooctanesulfonates, perfluorodecanesulfonates, octanesulfonates, decanesulfonates, alkyl benzene sulfonate), the fluorinated and non-fluorinated sulfate salts (e.g., dodecyl sulfates, lauryl sulfates, sodium lauryl ether sulfate, perfluorododecyl sulfate, and other alkyl and perfluoroalkyl sulfate salts). The majority of cationic surfactants contain a positively charged nitrogen atom, such as found in the quaternary ammonium surfactants, e.g., the alkyltrimethylammonium salts wherein the alkyl group typically possesses at least four carbon atoms and up to 14, 16, 18, 20, 22, 24, or 26 carbon atoms. Some examples of cationic surfactants include the quaternary ammonium surfactants (e.g., cetyl trimethylammonium bromide, benzalkonium chloride, and benzethonium chloride), the pyridinium surfactants (e.g., cetylpyridinium chloride), and the polyethoxylated amine surfactants (e.g., polyethoxylated tallow amine). Some examples of zwitterionic surfactants include the betaines (e.g., dodecyl betaine, cocamidopropyl betaine) and the glycinates. Some examples of non-ionic surfactants include the alkyl polyethyleneoxides, alkylphenol polyethyleneoxides, copolymers of polyethyleneoxide and polypropyleneoxide (e.g., poloxamers and poloxamines), alkyl polyglucosides (e.g., octyl glucoside, decyl maltoside), fatty alcohols, (e.g., cetyl alcohol, oleyl alcohol), fatty amides (e.g., cocamide MEA, cocamide DEA), and polysorbates (e.g., polysorbate 20, polysorbate 40, polysorbate 60, polysorbate 80).

In another aspect, the invention is directed to $TiO_2$ nanotubes produced according to the method described above. The produced nanotubes can possess any suitable phase of $TiO_2$. In some embodiments, the $TiO_2$ nanotubes are predominantly of a particular phase, such as anatase, rutile, or brookite. The phase can also be described in terms of a crystallographic type of lattice, such as an orthorhombic or tetragonal lattice. In other embodiments, the nanotubes possess a mixture of phases, or are amorphous. The nanotubes may also be transformed from one phase partially or predominantly into another phase. The nanotubes can be made to undergo a phase conversion by any suitable method known in the art, such as by subjecting the nanotubes to a temperature that induces a phase conversion, e.g., a post-annealing step conducted at a temperature of about 450° C. to induce a phase change from amorphous to anatase. The nanotubes may also be grown under suitable conditions of, for example, temperature, anodization voltage, water concentration, and choice of ionic liquid, such that one or more phases are favored, or that one or more phases are disfavored.

In addition, the $TiO_2$ nanotubes can include one or more dopant species by suitable doping procedures conducted either during the growth process (i.e., during anodization as an in situ doping process) or after the $TiO_2$ nanotubes have been produced (i.e., as a post-doping process). Some examples of dopants include the alkali metals (e.g., $Li^+$, $Na^+$, $K^+$), alkaline earth metals ($Mg^{2+}$, $Ca^{2+}$, $Sr^{2+}$, $Ba^{2+}$), transition metals (e.g., V, Cr, Mn, Fe, Co, Ni, Cu, Zn, Nb, W, and the noble metals), main group metals (e.g., B, Al, C, Si, N, P, As, Sb, F), and the rare earths (e.g., Ce, Nd, Eu). An in situ doping process may be conducted by, for example, including the dopant species in the electrolytic medium during the growth process. In particular, a metal dopant (e.g., Fe, Cu, and the like) can be incorporated in the nanotubes by being included in the titanium substrate, i.e., as an alloy, such as a Cu—Ti or Cu—Fe alloy. A post-doping process may be conducted by, for example, subjecting the TiO$_2$ nanotubes to a plasma etching, electron or ion bombardment, sputtering, CVD, or ion implantation; alternatively, the TiO$_2$ nanotubes may be exposed to a dopant-containing gas (e.g., NH$_3$, SiH$_4$, CH$_4$, H$_2$, or F$_2$), typically at an elevated temperature; or alternatively, the TiO$_2$ nanotubes may be subjected to a solution processing step wherein the solution contains the desired dopant species (e.g., ammonium or nitrate ions for nitrogen doping).

The TiO$_2$ nanotubes may also be suitably surface-functionalized or coated. For example, the TiO$_2$ nanotubes may be surface-functionalized by one or more reactive siloxane molecules which contain a functional group (e.g., hydroxyl, amine, ionic, or hydrophobic group). Alternatively, or in addition, the TiO$_2$ nanotubes can be coated (e.g., by a CVD process) with a metal or metal alloy (e.g., Ni, Pd, Pt, Ag, Au, Nb, W, or an alloy of these) or a main group element (e.g., B, C, N, P, or F) or a compound or material containing one or more of these elements. The surface functionalization or coating may serve any suitable function, such as to modify the photovoltaic properties, electron transport properties, catalytic properties, or interface properties.

The TiO$_2$ nanotubes can have any suitable outer diameter. For example, in different embodiments, the TiO$_2$ nanotubes may have an outer diameter of about, at least, or less than 25 nm, 30 nm, 35 nm, 40 nm, 45 nm, 50 nm, 60 nm, 70 nm, 80 nm, 90 nm, 100 nm, 120 nm, 150 nm, 200 nm, or 250 nm, or a range between any two of these values. In preferred embodiments, the TiO$_2$ nanotubes have an outer diameter of or less than 45 nm, 40 nm, 35 nm, 30 nm, or 25 nm.

The TiO$_2$ nanotubes can have any suitable pore (i.e., inner) diameter. For example, in different embodiments, the TiO$_2$ nanotubes may have a pore diameter of about, at least, or less than 5 nm, 10 nm, 15 nm, 20 nm, 25 nm, 30 nm, 35 nm, 40 nm, 45 nm, 50 nm, 60 nm, 70 nm, 80 nm, 90 nm, 100 nm, 120 nm, 150 nm, or 200 nm, or a range between any two of these values. The TiO$_2$ nanotubes can possess any of the foregoing pore diameters in combination with any of the above outer diameters, wherein it is understood that the pore diameter is less than the outer diameter, and the difference in pore diameter and outer diameter generally corresponds to the wall thickness.

The TiO$_2$ nanotubes can have any suitable wall thickness. For example, in different embodiments, the TiO$_2$ nanotubes may have a wall thickness of about, at least, or less than 1 nm, 2 nm, 3 nm, 4 nm, 5 nm, 10 nm, 12 nm, 15 nm, 18 nm, 20 nm, 25 nm, 30 nm, 35 nm, 40 nm, 45 nm, or 50 nm, or a range between any two of these values.

The TiO$_2$ nanotubes can have any suitable length. A desired length of the nanotube can generally be attained by growing the nanotube for a suitable period of time at a particular growth rate. In different embodiments, the TiO$_2$ nanotubes may have a length of about, at least, or less than, for example, 100 nm, 150 nm, 200 nm, 250 nm, 300 nm, 350 nm, 400 nm, 500 nm, 600 nm, 700 nm, 800 nm, 900 nm, 1 μm, 2 μm, 5 μm, 10 μm, 15 μm, 20 μm, 25 μm, 30 μm, 40 μm, 50 μm, 60 μm, 70 μm, 80 μm, 90 μm, 100 μm, or 120 μm, or a range between any two of these values. The corresponding length-to-diameter aspect ratio (i.e., "aspect ratio") can be, for example, at least about 5, 10, 20, 30, 40, 50, 100, 150, 200, 250, 500, 600, 700, 800, 900, 1000, or a range between any two of these values.

As used herein particularly in describing the outer diameter, pore size, wall thickness, and length of the nanotubes, the term "about" generally indicates within ±0.5, 1, 2, 5, or 10% of the indicated value (e.g., 40 nm±2%, which indicates 40±0.8 nm or 39.2-40.8 nm). Moreover, an outer diameter of about 40 nm can indicate either a measurement error for a physical characteristic of a single nanotube or a variation or average in a physical characteristic across several nanotubes.

When applied as a photovoltaic component, the produced TiO$_2$ nanotubes preferably possess recombination characteristics that result in sufficient photoconversion efficiencies. Preferably, the TiO$_2$ nanotubes possess a photoconversion efficiency of at least, for example, 4%, 5%, 6%, 7%, 8%, 9%, 10%, 11%, 12%, 13%, 14%, 15%, 16%, 17%, 18%, 19%, 20%, 21%, or 22%. The TiO$_2$ nanotubes also preferably possess a specific resistance of or less than $1.0\times10^{-2}$ Ω·cm, and more preferably, of or less than $1.0\times10^{-3}$ Ω·cm or $1.0\times10^{-4}$ Ω·cm.

In a particular embodiment, the invention is directed to an array of nanotubes attached to a substrate. The substrate is typically the substrate on which the nanotubes have been grown, i.e., titanium metal. However, the original substrate of titanium metal can be modified by numerous methods known in the art. For example, the titanium metal substrate can be overlayed with a coating of another metal (e.g., gold, platinum, nickel, or zinc), a metal oxide, or a polymeric material. The titanium metal substrate may alternatively be selectively removed (e.g., by acid etching, cutting, or melting) and wholly or partially replaced with another substrate.

The nanotube array can have a particular orientation with respect to the substrate surface. For example, in one embodiment, it is preferred for the longitudinal dimension of the nanotubes to be oriented either completely perpendicular to the surface (i.e., precisely) 90°, or substantially perpendicular to the surface, e.g., 90±10° (i.e., 80° to −80°), 90±5°, 90±2°, or 90±1° with respect to the surface. In another embodiment, it may be preferred for all or a portion of nanotubes to have a longitudinal dimension oriented obliquely to the surface within a range of angles, e.g., 45° to −45°, 60° to −60°, or 70° to −70°, with respect to the surface. In yet another embodiment, it is preferred for the longitudinal dimension of the nanotubes to be oriented either completely aligned (i.e., parallel) with the surface (i.e., precisely 0°), or substantially aligned to the surface, e.g., 0±10°, 0±5°, 0±2°, or 0±1° with respect to the surface. A non-perpendicular orientation of the nanotubes can be accomplished by, for example, applying an anisotropic force on the nanotubes during growth, either continuously (e.g., by pressing with a counter-surface or applying a directional flow pressure of anolyte) or in intervals (e.g., by sound wave burst or cavitation).

The nanotubes in the array can also possess a degree of uniformity. The uniformity can be in any desired property, such as the outer tube diameter, pore diameter, wall thickness, tube to tube spacing, length, orientation with respect to the substrate, aspect ratio, and/or one or more non-physical (i.e., property) attributes. In a particular embodiment, the nanotubes in the array are substantially uniform in one or more aspects. Typically, by being substantially uniform is meant that the nanotubes show no more than 15% or 10%, and more preferably, no more than 5%, 2%, 1%, 0.5%, or 0.1% deviation in one or more attributes of the nanotubes. In a particular embodiment, the nanotubes possess an ordered arrangement with each other. The ordered arrangement can be, for example, a hexagonal close packed or cubic arrangement.

In another aspect, the invention is directed to a photovoltaic device containing the TiO$_2$ nanotubes described above. The photovoltaic device can be any such device in which the TiO$_2$ nanotubes function as light absorbers, charge transporters, or both, in converting light (typically sunlight) into electrical energy.

In a particular embodiment, the $TiO_2$ nanotubes are incorporated in a dye-sensitized solar cell (DSSC) device. As known in the art, a DSSC device separates the light absorption and charge transport processes of a solar cell device by including a dye, also known as a dye sensitizer, which becomes electronically excited after absorbing a photon, whereafter the electronically excited dye injects an electron into a semiconductor oxide capable of charge transport. In the inventive DSSC device described herein, the $TiO_2$ nanotubes function as improved charge transporting materials which receive electrons from the dye. Typically, the DSSC contains an electrode (i.e., working electrode or photoanode) and a counterelectrode in contact with an electrolyte layer sandwiched therebetween, wherein the electrolyte layer commonly contains the charge transport material (herein, the $TiO_2$ nanotubes), a dye, a liquid medium, and typically, an oxidation-reduction pair. The electrolyte layer may also contain electrically conductive particles, such as carbon nanotubes, carbon fibers, carbon black, or the like. The electrolyte layer may also contain oxide semiconductor particles having a photovoltaic property, or alternatively, be in contact with an oxide semiconductor film having a photovoltaic property. Some examples of suitable oxide semiconductor particles or films include those composed of $Nb_2O_5$, $In_2O_3$, $BaTiO_3$, $SrTiO_3$, ZnO, ITO, $Bi_2O_3$, $SnO_2$, $Ho_2O_3$, $ZrO_2$, $Ta_2O_5$, $Al_2O_3$, $La_2O_3$, $Sr_2O_5$, $TiO_2$, $CeO_2$, and $Y_2O_3$. The particles are typically nanoparticles, which typically possess a size within the range of 1-200 nm, 1-100 nm, 5-200 nm, 5-100 nm, 10-200 nm, 10-100 nm, or 10-50 nm.

In the DSSC device, the $TiO_2$ nanotubes are in electrical contact with, and more typically, attached to, the electrode. The electrode and counterelectrode are commonly constructed of, for example, a transparent base material (e.g., PET, PEN, PC, or PES) coated with one or more conductive layers (e.g., ITO, $SnO_2$, FTO, Au, Pt, or a carbon-based, e.g., graphene material). The dye can be any suitable dye known in the art, such as an organic dye (e.g., eosin, rhodamine, melocyanine, coumarin) or an organometallic dye (e.g., ruthenium or iron complexes containing at least one bipyridine or terpyridine ligand). The liquid medium can include any suitable solvent (e.g., acetonitrile, propionitrile, ethylene carbonate, diethyl carbonate, DMSO), gelling agent (e.g., a polymer), electrolyte, or ionic liquid. The oxidation-reduction pair can be any of the oxidation-reduction pairs known in the art, including, for example, iodine/iodide, bromine/bromide, chlorine/chloride, or polyhalide ions, such as $I_3^-$, $I_5^-$, $I_7^-$, $Br_3^-$, $Br_2I^-$, and the like.

In another aspect, the invention is directed to a hydrogen generation device containing the $TiO_2$ nanotubes described above. The hydrogen generation device can be any such device in which the $TiO_2$ nanotubes function to photoelectrolytically react with water to form hydrogen. Typically, the electromagnetic radiation used by the $TiO_2$ nanotubes in the photoelectrolysis of water is solar radiation, or a component thereof (e.g., within the ultraviolet spectrum). The $TiO_2$ nanotubes may also be chemically configured to modify, expand, or narrow the light absorption range, such as to expand photoelectrolysis capability into visible light by use of a suitable modifier, such as CdS. In the device, the $TiO_2$ nanotubes are typically part of a photoanode as describe above, which, when acted upon by solar radiation, causes the photoelectrolysis of water to produce hydrogen. The photoanode is in electrical communication with a cathode, such as Pt. Typically, a liquid medium (e.g., electrolyte), as described above, is included to permit electron flow between the electrodes. The device can also be configured as a single photoelectrode system (i.e., wherein only the photoanode is photoactive), bi-photoelectrode system (i.e., wherein both the photoanode and counter-electrode are photoactive), hybrid photoelectrode system (i.e., wherein photovoltaic components, such as Si semiconductors, are included), or dye-sensitized photoelectrode system (i.e., wherein a dye is included to promote electron transport). The device preferably possesses a photocurrent density of at least 0.25, 0.5, 1.0, 2.0, 2.5, 3.0, or 3.5 $mA/cm^2$ at an appropriate voltage (e.g., 0.2V vs. Ag/AgCl). The rate of hydrogen evolution is preferably at least 1 L/h, and more preferably, at least 1, 2, 3, 5, 7, 10, 11, 12, or 15 L/h for a photoanode having an area of, for example, about or less than 0.5, 1, 1.5, or 2 $m^2$.

In yet another aspect, the invention is directed to a hydrogen gas sensor containing the $TiO_2$ nanotubes described above. The hydrogen gas sensor can be any such device in which a hydrogen gas-dependent shift in electrical resistance of the $TiO_2$ nanotubes is used as a basis for detecting the presence of hydrogen gas. The change in electrical resistance of the $TiO_2$ nanotubes from a hydrogen-less environment to a hydrogen-containing environment can be, for example, about or at least 50%, 100%, 200%, 500%, 1000%, 5000%, 10,000%, 50,000%, 100,000%, 200,000%, 300,000%, 400,000%, or 500,000%, for a change in concentration of hydrogen gas of or less than, for example, 10 ppm, 20 ppm, 50 ppm, 100 ppm, 200 ppm, 300 ppm, 400 ppm, or 500 ppm, or a range therein.

Examples have been set forth below for the purpose of illustration and to describe certain specific embodiments of the invention. However, the scope of this invention is not to be in any way limited by the examples set forth herein.

Example 1

Preparation of $TiO_2$ Nanotubes

The ionic liquid 1-butyl-3-methylimidazolium tetrafluoroborate ($BMIM-BF_4$) was mixed with deionized water in a $BMIM-BF_4$: water weight ratio of 0.276:1, and the resulting fluid used as the electrolyte. The anodization process was conducted on a 0.5 mm thick pure titanium foil (purchased from McMaster-Carr) using a two-electrode DC power supply with a voltage output range of 0-40 V. The titanium foil surface was used as-received (milled) and cleaned with acetone followed by an ethanol rinse before the synthesis. The titanium foil was connected as the working electrode and a piece of platinum mesh was used as the counter electrode. The synthesis was at room temperature, i.e., about 21° C. A constant potential of 10 volts was applied during the synthesis. The time-dependent anodization current was monitored using a multimeter. The current was about 2 mA at the beginning of the synthesis and gradually decreased and stabilized at a level of 0.5 mA for 80 minutes before being quickly increased to above 20 mA, at which point the synthesis was stopped.

Example 2

Microscopic Analysis of the $TiO_2$ Nanotubes

The as-anodized titanium surface prepared according to Example 1 above was analyzed by scanning electron microscopy (SEM). Before imaging, the surface was ultrasonically cleaned in acetone for 10 minutes during which time the top oxide layer was spalled off to expose the nanotubes underneath.

Figure 1B:
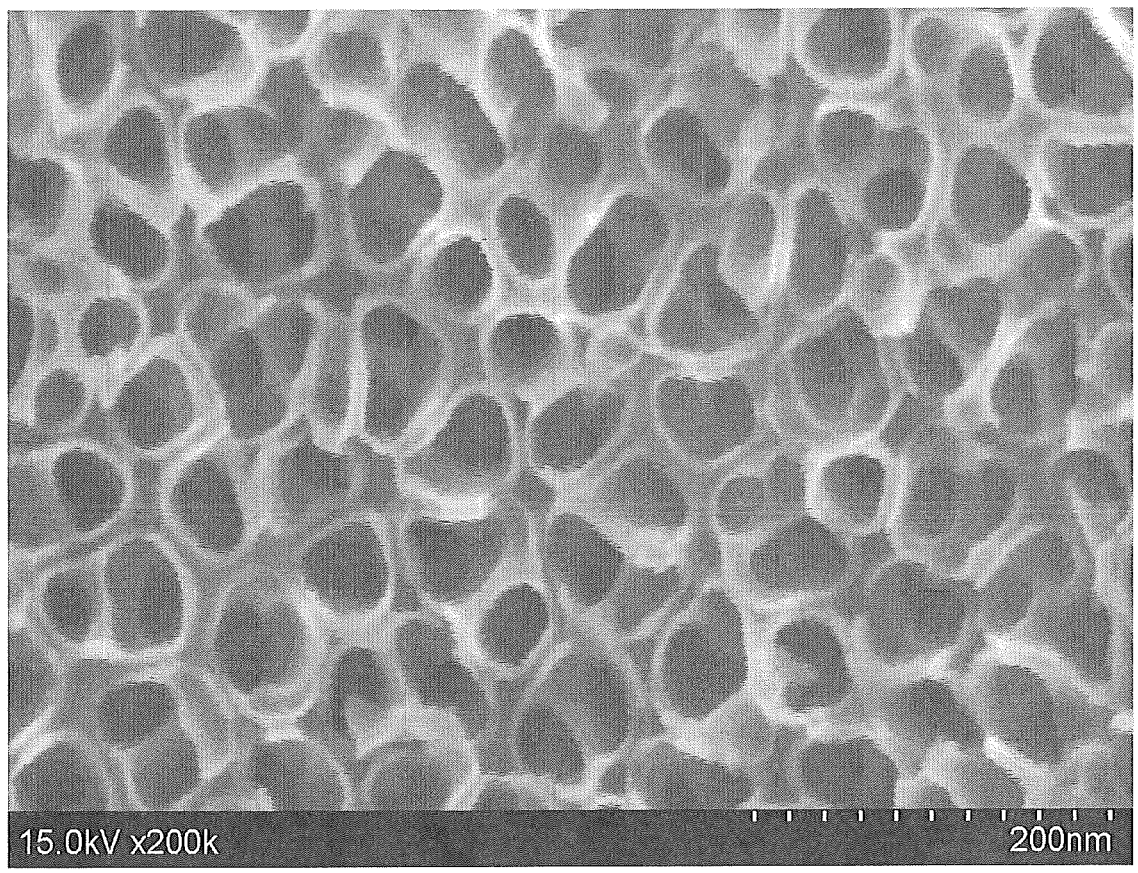

FIGS. 1A and 1B show 100,000× and 200,000× magnified, respectively, top view SEM micrographs of the surface. As shown, the SEM images show a thin, dense layer containing a highly ordered array of TiO$_2$ nanotubes covering the as-anodized titanium surface. The nanotubes are shown to have a pore size of 25-35 nm and an outer tube diameter of 40-55 nm.

Figure 2A:
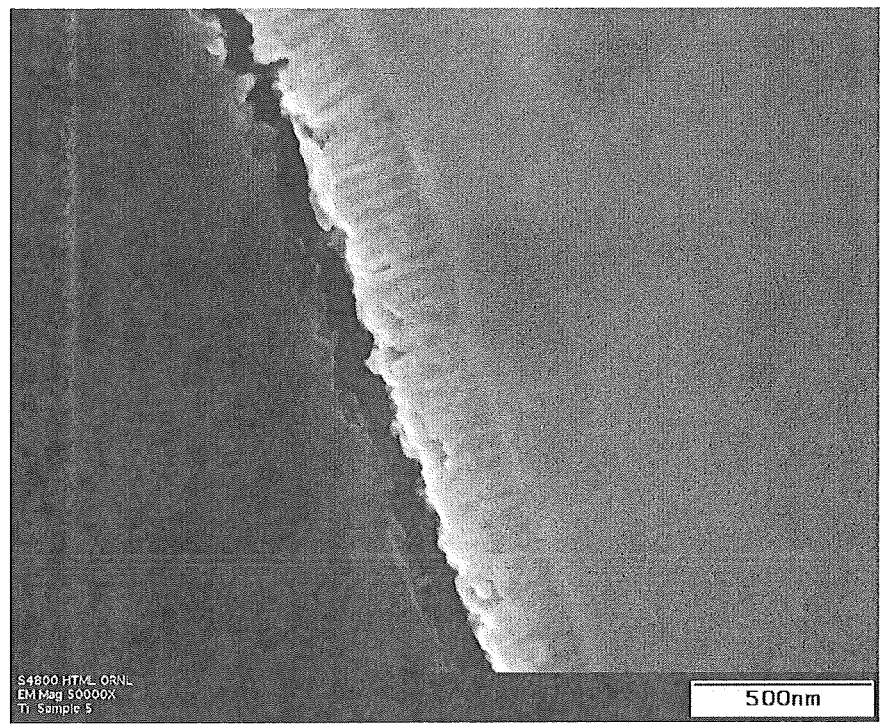
FIGS. 2A, 2B. Cross-sectional SEM micrographs at 50,000× magnification (FIG. 2A) and 100,000× magnification (FIG. 2B) of highly ordered $TiO_2$ nanotubes synthesized in the ionic liquid 1-butyl-3-methylimidazolium tetrafluoroborate ($BMIM-BF_4$).
Figure 2B:
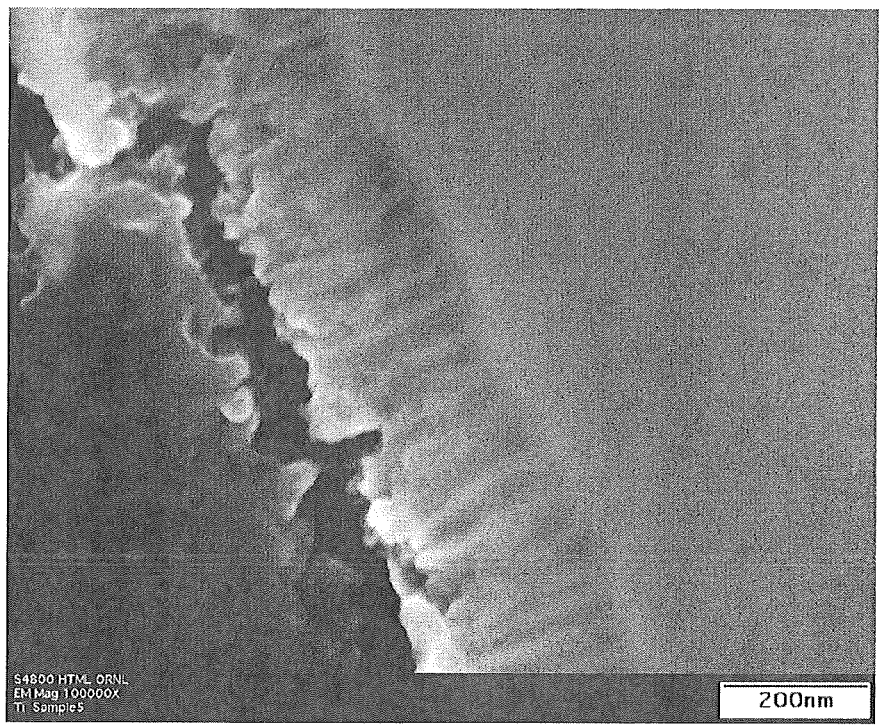

FIGS. 2A and 2B show 50,000× and 100,000× magnified, respectively, cross-sectional SEM micrographs of the surface. As shown, the nanotubes have a length of 250-350 nm.

While there have been shown and described what are at present considered the preferred embodiments of the invention, those skilled in the art may make various changes and modifications which remain within the scope of the invention defined by the appended claims.

What is claimed is:

1. A method for producing titanium dioxide nanotubes, the method comprising anodizing titanium metal in contact with an electrolytic medium comprised of an ionic liquid compound and 1-5 wt % water by total weight at an anodization voltage of at least 10 volts for a suitable period of time to obtain titanium dioxide nanotubes of a particular length.

2. The method of claim 1, wherein the ionic liquid has the formula:

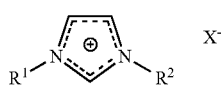

(3)

wherein R$^1$ and R$^2$ are each independently a saturated or unsaturated, straight-chained, branched, or cyclic hydrocarbon group having at least one carbon atom, and optionally substituted with one or more oxygen, nitrogen, and/or fluorine atoms; and X$^-$ is a counteranion.

3. The method of claim 2, wherein R$^1$ and R$^2$ each contain up to six carbon atoms.

4. The method of claim 2, wherein R$^1$ and R$^2$ are straight-chained, branched, or cyclic alkyl groups.

5. The method of claim 4, wherein said alkyl groups contain up to six carbon atoms.

6. The method of claim 1, wherein said ionic liquid contains a fluorine-containing counteranion.

7. The method of claim 2, wherein said counteranion is a fluorine-containing anion.

8. The method of claim 6, wherein said fluorine-containing anion is selected from the group consisting of BF$_4^-$, PF$_6^-$, N[SO$_2$CF$_3$]$_2^-$, N[SO$_2$CF$_2$CF$_3$]$_2^-$, and CF$_3$SO$_3^-$.

9. A method for producing titanium dioxide nanotubes, the method comprising anodizing titanium metal in contact with an electrolytic medium comprised of an ionic liquid compound and at least about 25 wt % water by total weight of ionic liquid and water at an anodization voltage of 1-10 volts.

10. The method of claim 9, wherein said amount of water is at least about 50 wt % by total weight of ionic liquid and water.

11. The method of claim 9, wherein said amount of water is at least about 75 wt % by total weight of ionic liquid and water.

12. The method of claim 1, wherein said titanium dioxide nanotubes possess an outer diameter of or less than 45 nm.

13. The method of claim 1, wherein said titanium dioxide nanotubes possess an outer diameter of or less than 40 nm.

14. The method of claim 1, wherein said titanium dioxide nanotubes possess an outer diameter of or less than 35 nm.

15. The method of claim 1, wherein said titanium metal is in the form of a foil.

16. The method of claim 1, wherein said anodization voltage is at least 15 volts.

17. The method of claim 1, wherein said anodization voltage is at least 20 volts.

18. The method of claim 1, wherein said electrolytic medium is comprised of an ionic liquid and 2-5 wt % water by total weight of ionic liquid and water.

19. The method of claim 1, wherein said titanium dioxide nanotubes possess a length of at least 1 micron.

* * * * *